(12) United States Patent
Schmitt et al.

(10) Patent No.: US 9,178,882 B1
(45) Date of Patent: Nov. 3, 2015

(54) CONCURRENT, DIVERSE PARTY MULTI-PROCESSOR WIRELESS QUALITY METRIC COLLECTION CIRCUITS AND METHOD OF OPERATION

(71) Applicants: Dan Schmitt, Adelphi, MD (US); R Travis Jones, Lake Zurich, IL (US); Bruce Blaine Lacey, Foster City, CA (US)

(72) Inventors: Dan Schmitt, Adelphi, MD (US); R Travis Jones, Lake Zurich, IL (US); Bruce Blaine Lacey, Foster City, CA (US)

(73) Assignee: Carrier iQ, Inc., Sunnyvale, CA (US)

( * ) Notice: Subject to any disclaimer, the term of this patent is extended or adjusted under 35 U.S.C. 154(b) by 21 days.

(21) Appl. No.: 14/261,406

(22) Filed: Apr. 24, 2014

(51) Int. Cl.
| | |
|---|---|
| *H04L 29/06* | (2006.01) |
| *H04W 12/06* | (2009.01) |
| *H04W 12/04* | (2009.01) |
| *G06F 7/04* | (2006.01) |
| *G06F 15/16* | (2006.01) |
| *G06F 17/30* | (2006.01) |

(52) U.S. Cl.
CPC ........ *H04L 63/0876* (2013.01); *H04L 63/0435* (2013.01); *H04W 12/04* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 8,725,112 B2* | 5/2014 | De Atley et al. | 455/410 |
| 2010/0151790 A1* | 6/2010 | Hoeksel et al. | 455/41.2 |
| 2012/0079105 A1* | 3/2012 | Hoffman | 709/224 |
| 2012/0216242 A1* | 8/2012 | Uner et al. | 726/1 |
| 2012/0260095 A1* | 10/2012 | Von Hauck et al. | 713/176 |
| 2013/0316725 A1* | 11/2013 | MacGougan et al. | 455/456.1 |
| 2014/0082117 A1* | 3/2014 | Unhale et al. | 709/208 |
| 2014/0181471 A1* | 6/2014 | Juang et al. | 712/30 |
| 2014/0373184 A1* | 12/2014 | Mahaffey et al. | 726/35 |

* cited by examiner

*Primary Examiner* — Shin-Hon Chen
(74) *Attorney, Agent, or Firm* — Patentry

(57) ABSTRACT

A system includes a bidirectional signal bus controlled by an M×S master/slave bridge circuit. An application processor having at least one core is communicatively coupled by the bidirectional signal bus to a radio processor having at least one virtual machine. The core hosts a master agent. The virtual machine hosts a slave agent. Each master agent is coupled to a collector server by an authenticated connection circuit to receive and store profiles and build and transmit packages. Each master agent is coupled to at least one slave agent and can transmit a profile to the slave agent and request and receive packages which are generated by the slave agent by executing the profile. Each slave agent receives and executes profiles to collect data from radio circuits and upon command builds and transmits data packages to a master agent.

8 Claims, 11 Drawing Sheets

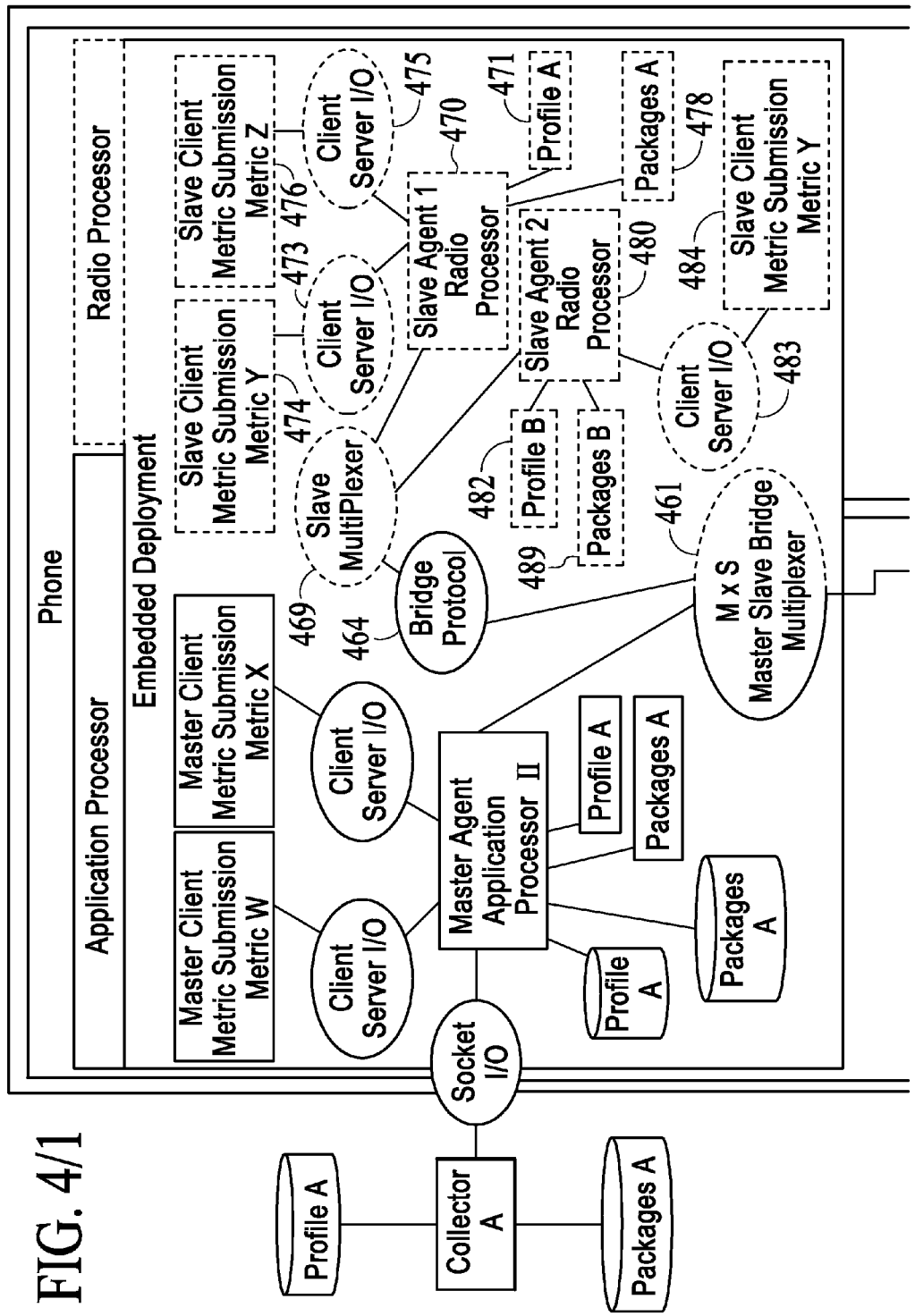
FIG. 4/1

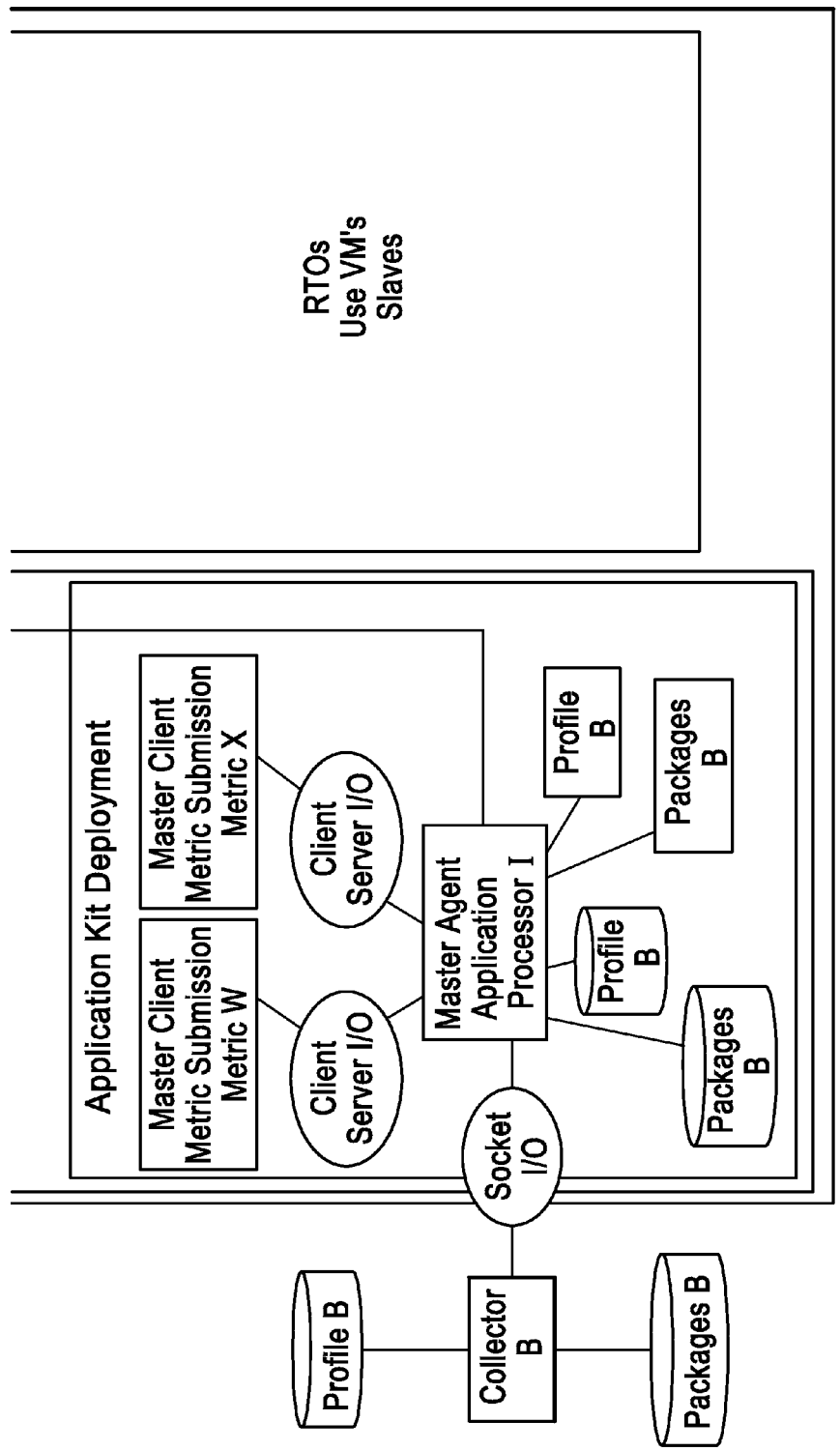
FIG. 4/2

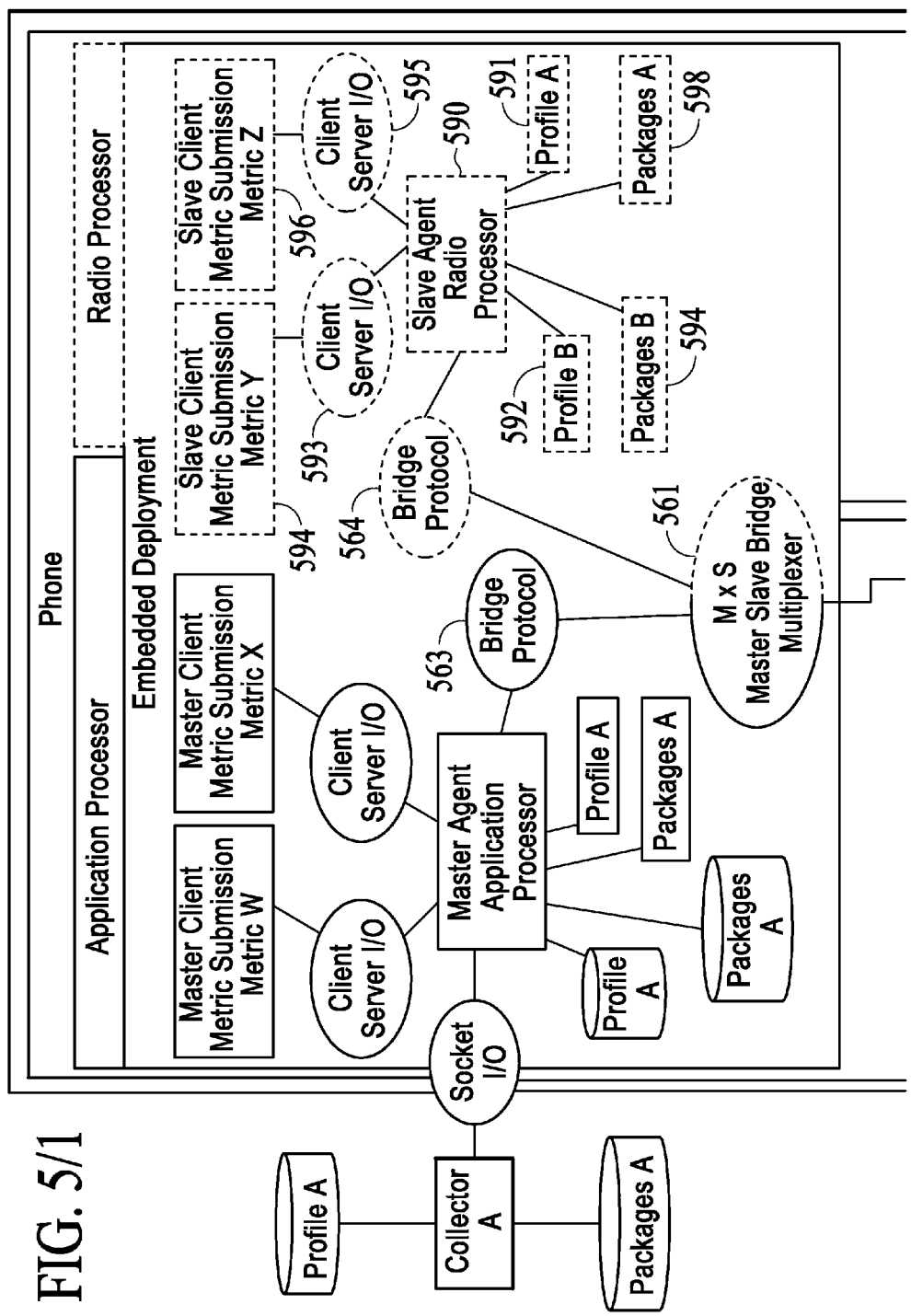
FIG. 5/1

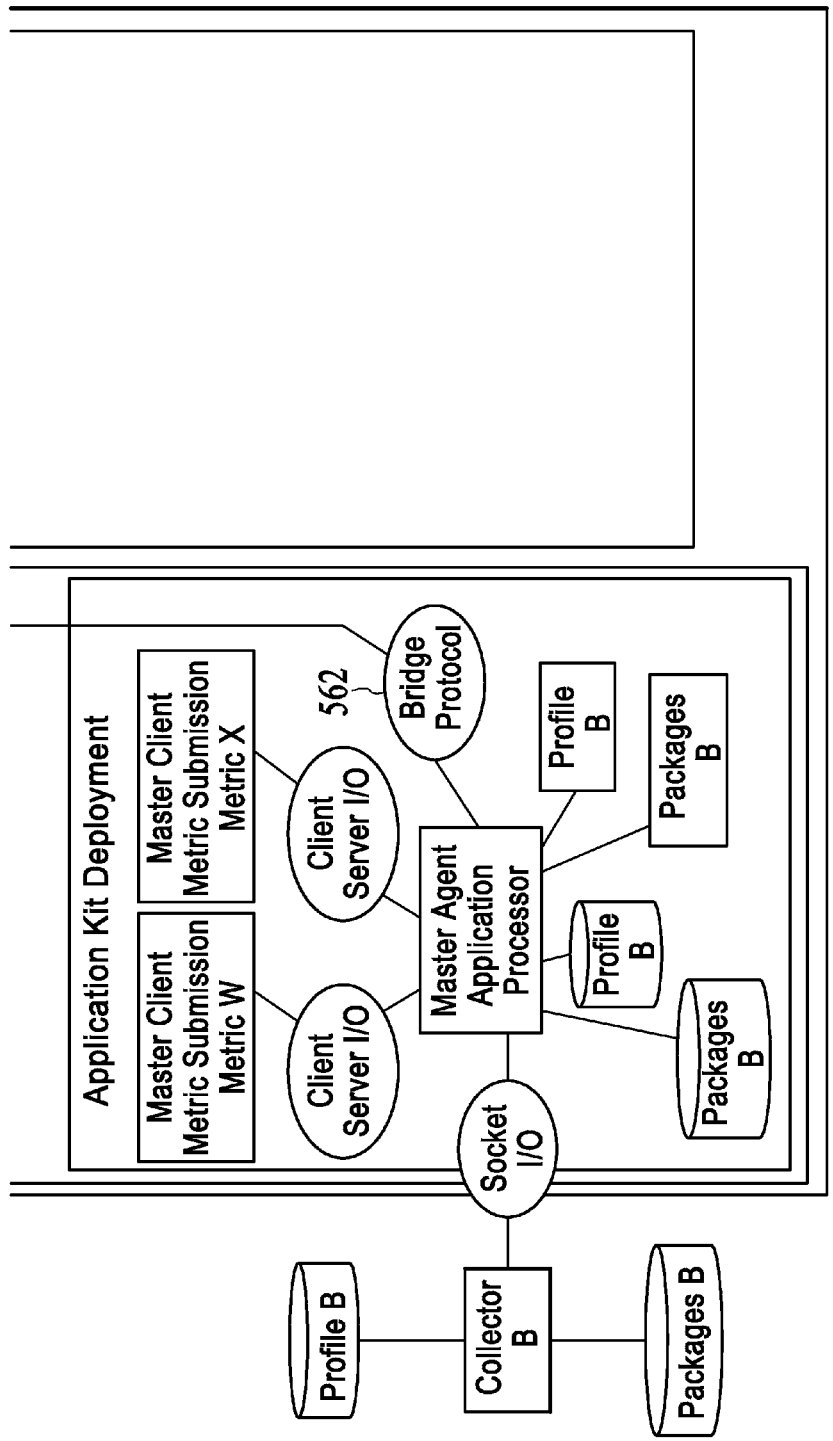
FIG. 5/2

CONCURRENT, DIVERSE PARTY MULTI-PROCESSOR WIRELESS QUALITY METRIC COLLECTION CIRCUITS AND METHOD OF OPERATION

RELATED APPLICATIONS none

BACKGROUND OF THE INVENTION

In a conventional mobile phone, an application processor is coupled by a bus to a radio processor which operates as a slave for quality of service statistical data collection. The slave processor has a slave agent pre-installed from chip-set vendor. The slave agent may be a circuit or a processor executing instructions in firmware or non-transitory storage.

In a conventional system, access to the slave agent on the radio processor is restricted to the embedded distribution only. The master/slave bridge is 1 to 1, not standardized, and only exposed solely to application processor agents that are built on the ROM by the OEM. Some metrics are sourced from client code in the framework to connect to an embedded agent as well. Access to the radio processor is controlled by keeping the interface private and proprietary and developing custom software for the application processor which is hidden, undocumented, and subject to change without notice.

Conventional master-slave configurations provisioned by mobile wireless device original equipment manufacturers support only one master and one slave circuit pair.

What is needed is a way that any arbitrary numbers of partners (the carrier, the manufacturer, and data analysts, etc.) can install an Application Kit and have access to radio side slave agent quality metrics and partner specific collection and reporting.

SUMMARY OF THE INVENTION

A single bus is controlled by an M×S master/slave bridge. An application processor may have a plurality of cores, each hosting a master agent. A baseband processor may have one or more virtual machines controlled by a real time scheduler. A broadband processor may have one or more slave agents, each operating in a virtual machine scheduled by a realtime scheduler.

Each master agent has at least one store for a profile and packages generated by executing the profile. Each slave agent has at least one store for a profile and packages generated by executing the profile.

An M×S master/slave bridge enables communication between at least one master agent and at least one slave agent. The real time scheduler may be configured to provide uneven shares of time among slave agents within the broadband processor.

BRIEF DESCRIPTION OF DIAGRAMS

FIGS. 2-7 are block diagrams of systems, processes, interfaces, and non-transitory stores which embody the present invention as an apparatus.

DETAILED DISCLOSURE OF EMBODIMENTS

Figure 1A:
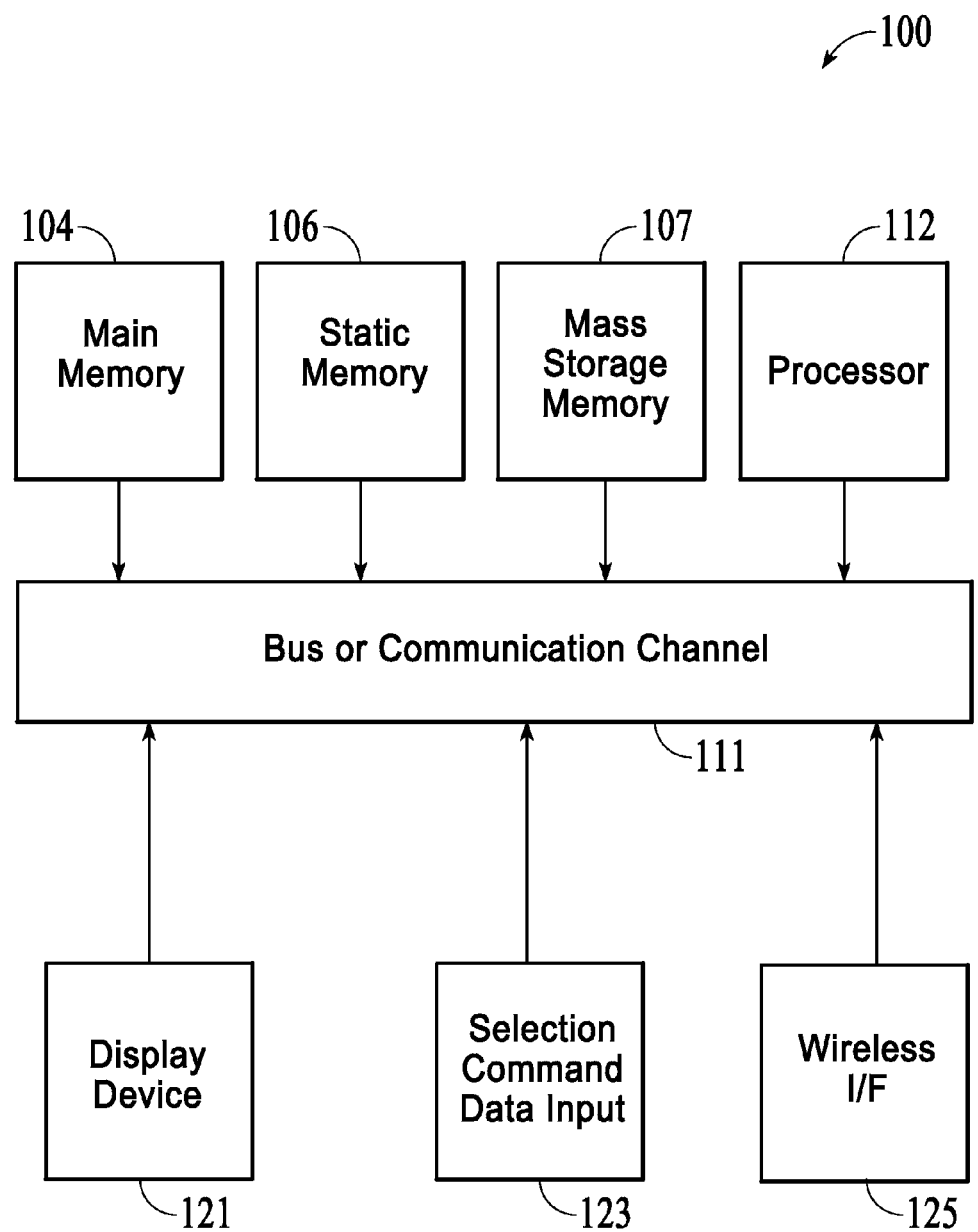
FIGS. 1A and 1B are block diagrams for application processors and baseband processors.

One aspect of the invention is an apparatus having an electronic signal communication bus between an application processor and a baseband processor; the baseband processor comprising at least one slave agent circuit; the application processor comprising at least one master agent circuit; wherein the at least one slave agent circuit is embedded during its manufacturing and test process, and wherein the at least one master agent is received and installed during a wireless connection to a network server after authentication and validation of a profile using a private key of the at least one slave agent circuit.

Another aspect of the invention is an apparatus having an electronic signal communication bus between an application processor and a baseband processor; the baseband processor comprising a plurality of slave agent circuits; the application processor comprising at least one master agent circuit; wherein at least one slave agent circuit is embedded during its manufacturing and test process, and wherein the at least one master agent is received and installed during a wireless connection to a network server after authentication and validation of a profile using a private key of the at least one slave agent circuit.

Another aspect of the invention is an apparatus having an electronic signal communication bus between an application processor and a baseband processor; the baseband processor comprising at least one slave agent circuit; the application processor comprising a plurality of master agent circuits; wherein the at least one slave agent circuit is embedded during its manufacturing and test process, and wherein at least one master agent is received and installed during a wireless connection to a network server after authentication and validation of a profile using a private key of the at least one slave agent circuit.

In an embodiment, at least one slave agent circuit includes an authentication circuit to validate a received profile and to authenticate each data connection to a master agent circuit; a trigger circuit to determine when a condition within a received profile is fulfilled; and a transformation circuit to quantize, store and transfer a radio metric value from the baseband processor via an authenticated data connection to a master agent circuit.

In an embodiment, the application processor includes a received profile store containing a digital signature associated with the received profile and with a private key of a slave agent circuit.

Another aspect of the invention is a method for operation of a multiple profile defined wireless data collection apparatus by executable instructions stored in non-transitory media causing a processor to perform receiving and installing a validated master agent application; recording metrics according to an authenticated collection profile; and transmitting transformed metrics to the master agent, whereby a slave agent circuit embedded during manufacturing, and test of a baseband processor validates a master agent installed by wireless transmission and accepts a data collection profile associated with the master agent.

In an embodiment, receiving and installing a validated master agent application includes opening a secure communication channel to a wireless network server; authenticating the server; requesting by the application processor, a master agent installation file; and verifying the file against a private key and installing the master agent.

In an embodiment, recording metrics according to an authenticated collection profile includes receiving a data collection profile associated with a certain master agent, validating the data collection profile with a private key, and upon determining a condition within the data collection profile is fulfilled, quantizing and storing a radio metric.

In an embodiment, transmitting transformed metrics to a master includes transforming a radio metric to contain a destination connection identity, opening a private connection to a specific master agent identified in a collection profile, and upon verification of a private data connection, transferring the transformed metric.

One embodiment of the system includes a bidirectional signal bus controlled by an M×S master/slave bridge circuit. A first application processor having at least one core is communicatively coupled by the bidirectional signal bus to a second baseband or radio processor having at least one virtual machine. An application processor core hosts a master agent. A radio processor virtual machine hosts a slave agent.

Each master agent is communicatively coupled to at least one collector server by an authenticated connection circuit to receive and store profiles and build and transmit packages.

Each master agent is communicatively coupled to at least one slave agent and can transmit a profile to the slave agent and request and receive packages which are generated by the slave agent by executing the profile.

Each slave agent is communicatively coupled by an authenticated connection circuit to at least one master agent and upon command receives and executes profiles to collect data from radio circuits and upon command builds and transmits data packages to the master agent.

To support any application side agent connection to the slave we standardize the master/slave bridge protocol to support more than one master. In an embodiment, a slave agent supports more than one profile.

In an embodiment, a plurality of slave agents each have one profile but the realtime scheduler controls each virtual machine hosting each slave agent. A slave agent may run natively in the RTOS of the baseband processor or within a virtual machine.

Given that data collected by the master or slave agent is generated at one or more external entities, in another embodiment, a similar 1×n bridge multiplexer enables delivery of metric information from an external process on the application processor to any number of master agents for collection. In an embodiment, a 1×n bridge multiplexer on the slave agent provides delivery of metric information to all slave agents.

The degenerate case of a 1×1 master slave bridge across a common interface still provides value to single reporting data collection by standardizing the external interface. This allows independent release scheduling of a master from that of a slave and vice versa.

A conventional embedded master/slave bridge configuration requires the participation of OEMs in implementation of the master/slave bridge.

A maintenance release of the conventional master/slave bridge defaults to M=1 and S=1 but has software configurability to support M cores or S virtual machines or both as appropriate to the original equipment manufacturer (OEM) of the wireless connected device (wcd).

In an embodiment, the apparatus further comprises access network connection circuits to enable no charge data upload to a carrier or internet service provider.

The master slave bridge multiplexer decouples delivery of agent virtualization from baseband processor manufacturer's or OEMs' schedule and decouples the bridge interface from the agent implementation.

In an embodiment, the master-slave bridge multiplexer participates in the authentication of commands to the slave(s). In an embodiment, the master-slave bridge multiplexer arbitrates version compatibility or incompatibility among master-slave permutations.

In an embodiment the apparatus provides an authenticated connection circuit at each of the master/slave and client/server (M×S) connections. In an embodiment the apparatus further has one or more isolated profile/package memory area on both the master/slave. In an embodiment the circuits further include an encrypted package store on the master. In an embodiment of the radio processor apparatus, the apparatus includes an encrypted package store on the slave circuit.

Figure 2:
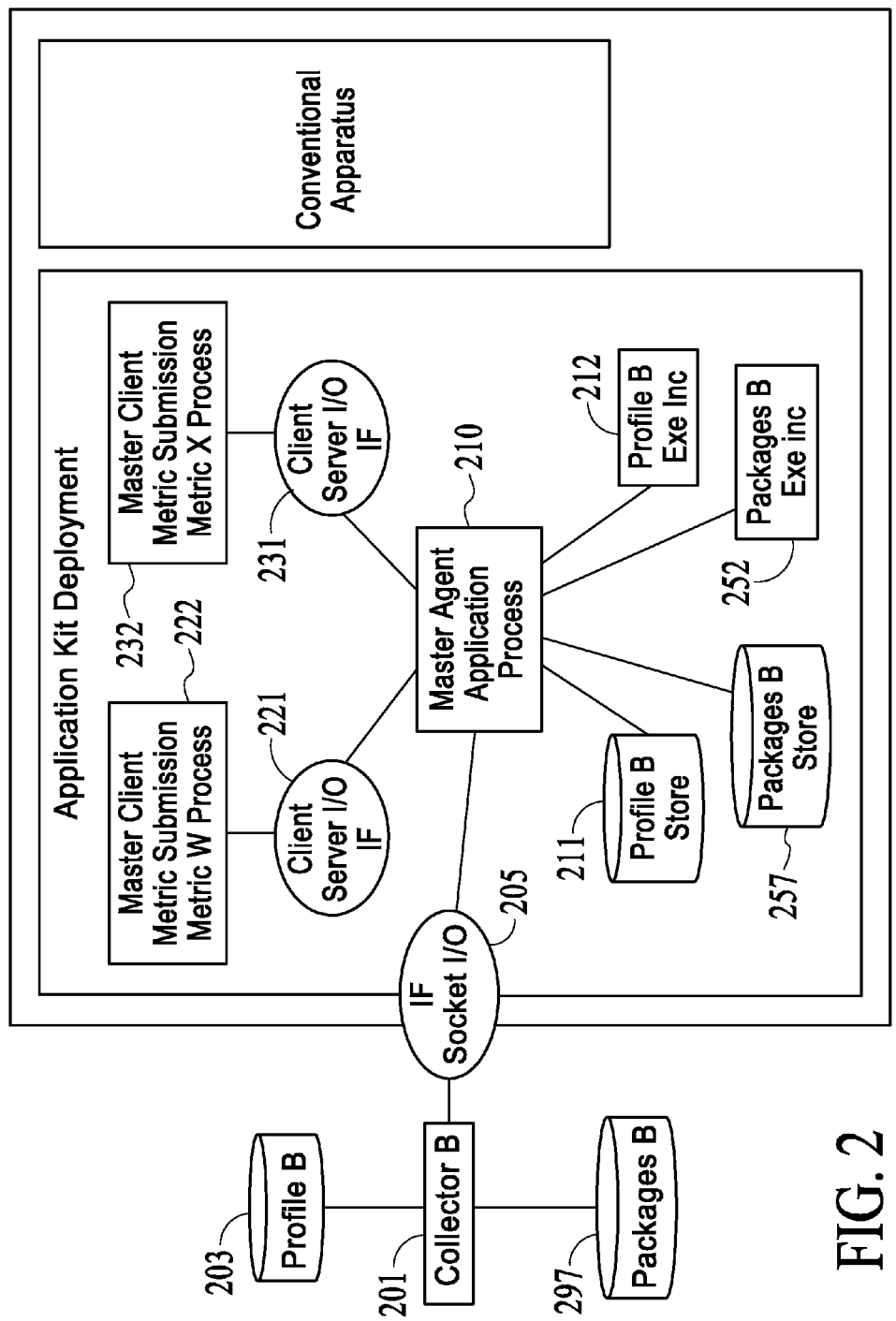

Referring now to FIG. 2, a conventional installation of profile based collection installed on an application processor is illustrated. A first collector B 201 is coupled to non-transitory stores containing Profile B 203 and Packages B 297. The collector is coupled through Socket I/O interface 205 to a master agent process 210 operative on an application processor of a mobile device. The master agent has access to in memory images of profile B 212 and of packages B 252 and is coupled to non-transitory stores for profile b 211 and packages B 257. The master agent also has access via client server I/O interfaces 221 231 to processes for master client metric submissions metric W and metric X 222 232.

Figure 3:
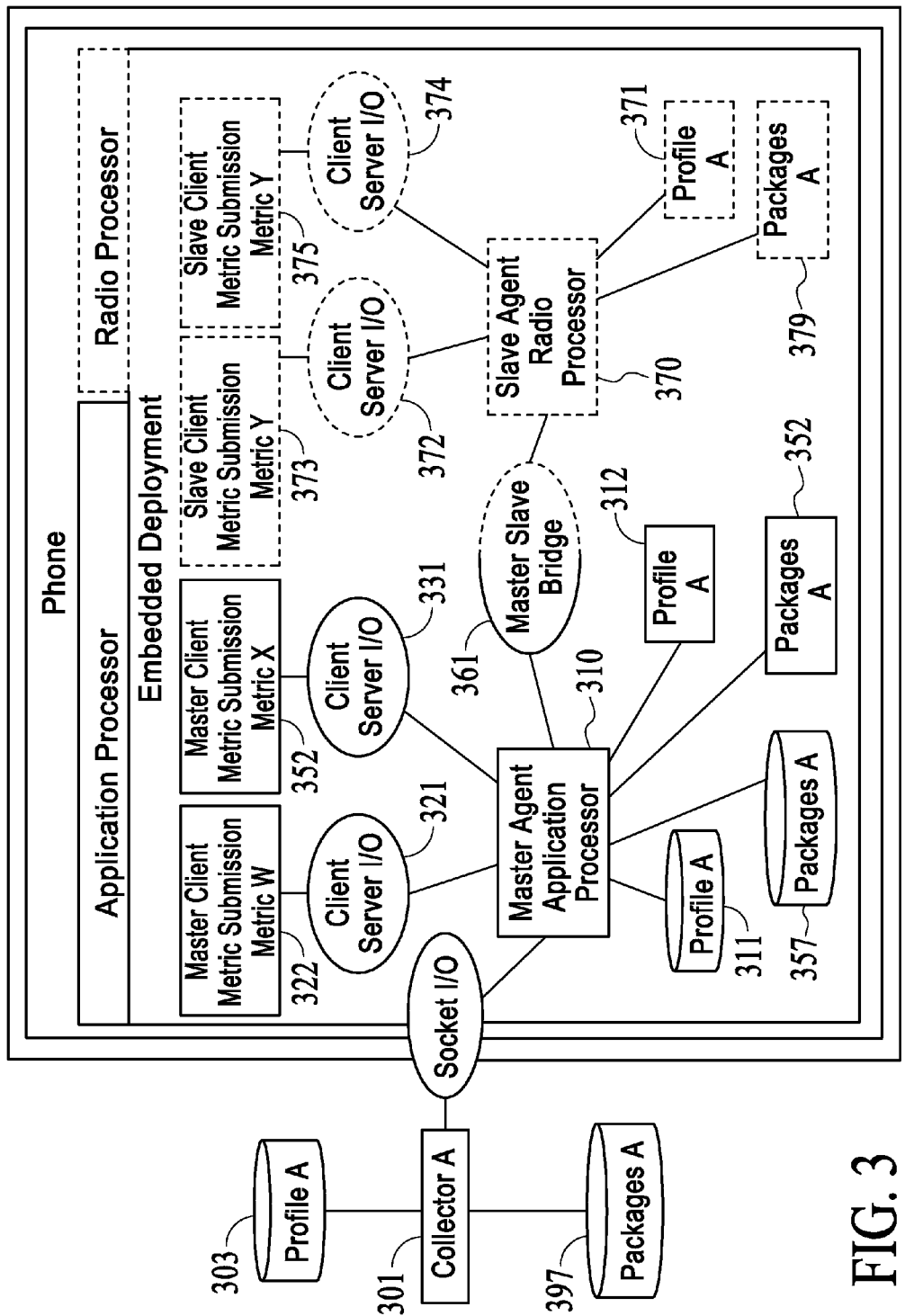

Referring now to FIG. 3, a conventional installation of profile based collection installed on an application processor and a radio processor is illustrated.

A second collector A 301 is coupled to non-transitory stores containing Profile A 303 and Packages A 397. The collector is coupled through Socket I/O interface 305 to a master agent process 310 operative on an application processor of a mobile device. The master agent has access to in memory images of profile A 312 and of packages A 352 and is coupled to non-transitory stores for profile A 311 and packages A 357. The master agent also has access via client server I/O interfaces 321 331 to processes for master client metric submissions metric W and metric X 322 332.

In this conventional installation a slave agent 370 operative in a radio processor is coupled via a master slave bridge interface 361 to the master agent 310. The slave agent has in memory images of profile A 371 and packages A 379 which it fulfills by using client server I/O interfaces 372 374 to collect Metric f and Metric Z from slave client metric submission processes 373 375. What is needed is a way to reduce development cost, time to market, and support requests for data from unaffiliated entities.

Referring now to FIG. 4, an embodiment utilizing multiple cores to host Master Agents I and II coupled to multiple virtual machines hosting slave agents 1 and 2 is illustrated. Each Master Agent is coupled to an M×S master-slave bridge multiplexer 461. The bridge multiplexer is coupled through a bridge protocol process 464 to a slave multiplexer 469. A plurality of virtual machines host slave agents 1 and 2 470 480 which are communicatively coupled to slave multiplexer 469. In an embodiment slave agent 1 has in memory images of profile A 471 and package A 478 which it fulfills by using client server I/O processes 473 and 475 to collect data from slave clients 474 476 for metric y and metric z. In an embodiment, slave agent 2 480 has in memory images of profile B 482 and package B 489 which it fulfills by using client server I/O process 483 to collect metric Y from slave client 484. This is an illustration of M master agents interoperating with S slave agents under software control. Authenticated commands could download, configure, and control changes in M and in S.

Referring now to FIG. 5, each Master Agent 210 310 is coupled through a bridge protocol process 562 563 to a M×S master slave bridge multiplexer 561. A bridge protocol process 564 couples the M×S master slave bridge multiplexer to what appears to be a single slave agent radio processor 590 which has in-memory images of profiles 591 592, packages 598 599 and is coupled to client server I/O processes 593 594 to collect metric Y and metric Z from slave client agents 594 596. The M×S master slave bridge multiplexer receives and forwards profiles from different master agents and returns the correct package to each master agent.

Figure 6:
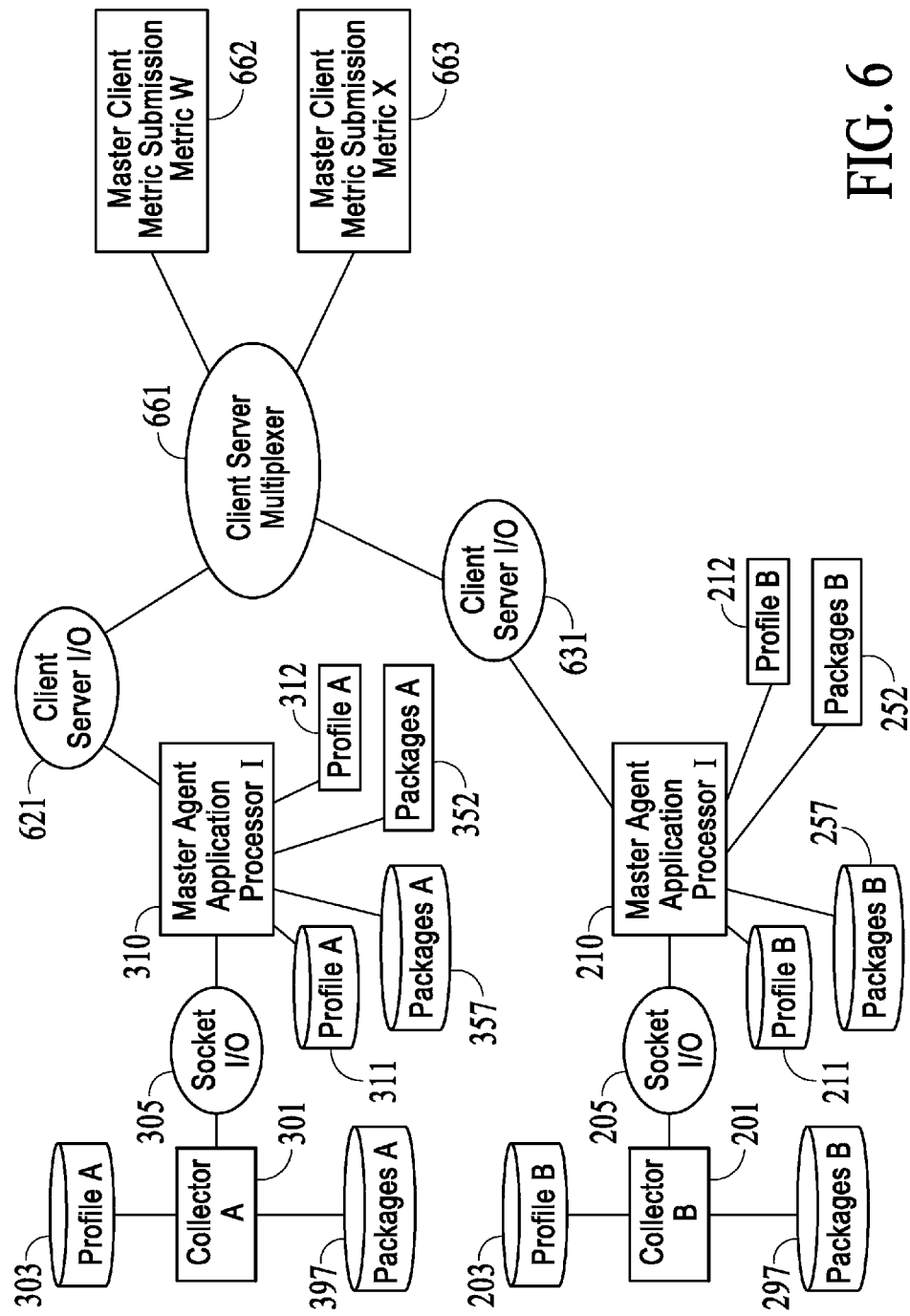

Referring now to FIG. 6, an embodiment illustrates an optimization to optimize operation of master agent I 210 and master agent II 310 operative in an application processor. A single instance of Master Client Metric Submission Process for Metric W 662 and a single instance of Master Client Metric Submission Process for Metric W 663 are coupled via a client server multiplexer 661 to a client server I/O process 621 coupled to Master Agent II 310 and also to a client server I/O process 631 coupled to Master Agent I 210. This optimization would improve the efficiency of Application Kit Deployments which do not interface to a slave agent on a radio processor. A multi-core application processor would be a suitable host of multiple master agents.

Figure 7:
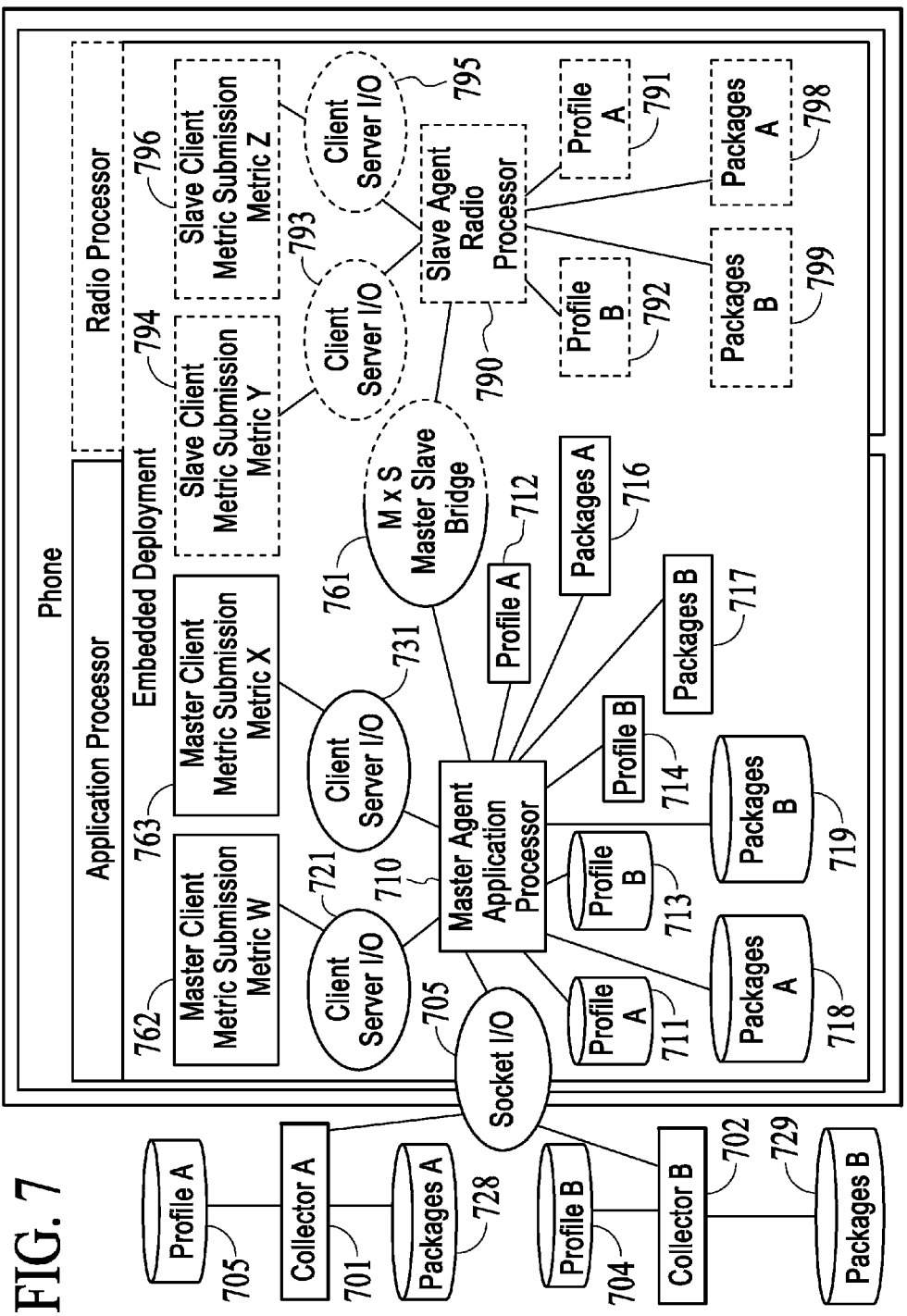

Referring now to FIG. 7, a representation of function viewports is presented from various perspectives. Socket I/O 705 presents each of the collector apparatuses 701 and 702 with a destination for a profile 703 704 and a source of packages 728 729. Each collector may perceive itself to be the dedicated user of socket I/O service 705 to connect to a single Master Agent 710 implemented as instructions controlling an application processor. The functional viewport of the master agent 710 to socket I/O 705 and to the Slave Agent Radio Processor 790 presents that the Master agent is coupled to client server I/O s 721 731 and is coupled to non-transitory stores for profiles 711 713 and packages 718 719. The apparent master agent comprises in memory images of profiles 712 714 and packages 716 717. An M×S master slave bridge 761 presents this functional view port to one or more slave agents resident in the radio processor. The M×S master-slave bridge 761 also presents a functional viewport to one or more master agents of a unified slave agent radio processor 790 coupled to client server I/O processes 793 795 and having in memory images of profiles 791 792 and packages 798 799. It appears that the client server I/O processes provide access for a slave agent radio processor to collect client submissions from metric processes 794 796. The M×S master-slave bridge 761 authenticates and validates profiles and packages passing between any master and any slave.

An exemplary cooperative multi-tasking implementation: An embodiment supports processing a context (or data structure related to a particular collection profile) can implement distinct processing by packagers by passing the context to process in different calls.

Figure 8A:
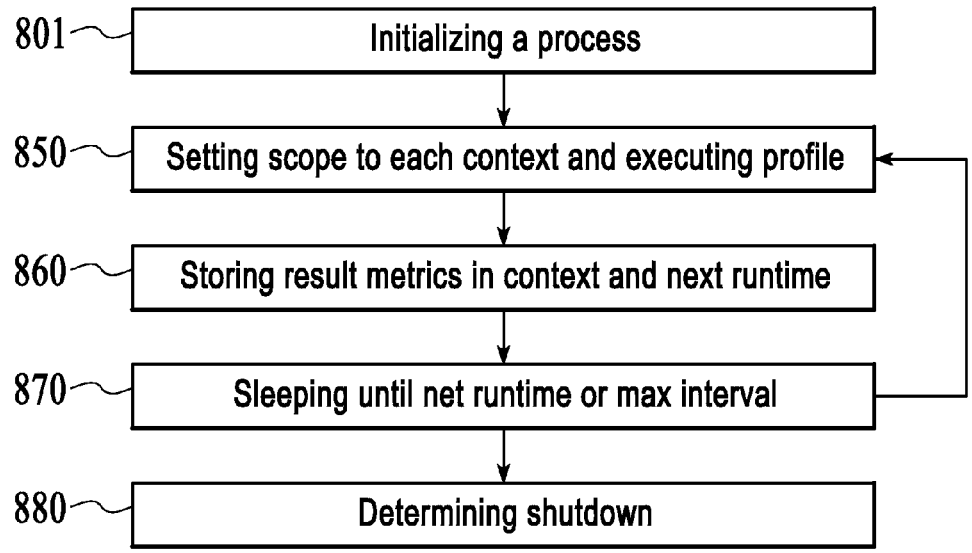
FIGS. 8A and 8B are flowcharts of a method.
Figure 8B:
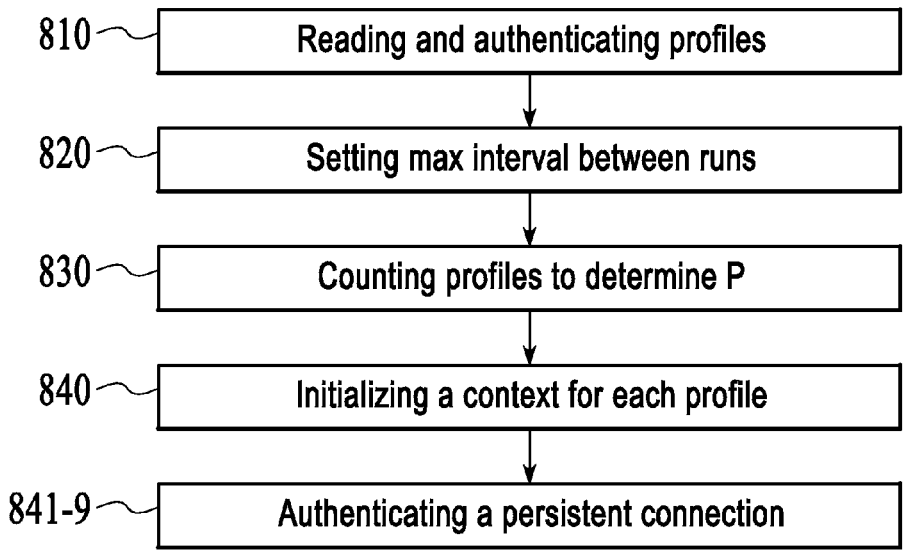

In a method embodiment illustrated but not limited to the example of FIGS. 8A and 8B, an agent either in the application processor or in the radio processor, or agents in both initializes a process 801; and until shutdown 880; repeatedly, set scope to each context and execute profile 850, store result metrics in context and next runtime 860, and sleep until next runtime or max interval 870. In one illustrative implementation, an embodiment of initializing a process 801 includes reading and authenticating P profiles 810; setting max interval between runs 820; counting profiles to determine P 830; initializing a context for each profile 840; and authenticating a persistent connection between a master and a slave 841-849 whereby metrics collected for an authenticated profile will only transit the persistent connection to its associated master. In an embodiment each profile is authenticated by its provenance. When a master requests a connection, it is assigned an index which is unique and not reusable. The index is part of the connection between the master and the slave and prevents data leakage to other processes of the application processor. No other master may use that index.

The following conceptual process would be implementable in a variety of executable formats by those skilled in the art:

```
listOfprofiles={profile1, profile2 .... profileN};
for (k=0;k<listOfprofiles.length( ) k++) {
listOfContexts.append(
IQBackend_Init(listOfprofiles.get(k)));
}
while(!shutdown) {
   int nextWait=MAX_INT;
   for (k=0;k<listOfContexts.length( ) k++) {
      nextRun=
IQBackend_Execute(listOfContexts.get(k)));
      if (nextRun<nextWait) {
         nextWait=nextRun;
      }
   }
   sleep(nextRun);
}
for (k=0;k<listOfContexts.length( ) k++) {
IQBackend_Shutdown(listOfContexts.get(k)));
}
```

CONCLUSION

The present invention is easily distinguished from conventional systems which contain a single client-server, or master-slave pair. In the present invention, a master may support multiple profiles and direct packages to different collector destinations. A master agent may control one or more slaves on the baseband processor which each use a virtual machine to collect the superset of data desired by all profiles. A master agent prepares a package for each profile by transforming measurements according to the profile. The master agent further transforms the package with additional data and transmits it to the collector defined in its respective profile. The system is distinguished by supporting multiple master agents each using a core in the application processor. An agent embedded in the radio processor authenticates profiles and agents downloaded to the application processor.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

An Exemplary Computer System

FIG. 1A is a block diagram of an exemplary processor that may be used to perform one or more of the functions described herein. Referring to FIG. 1A, processor 100 may comprise an exemplary client 150 or server 100 process. Processor 100 comprises a communication mechanism or bus 111 for communicating information, and a processor core 112 coupled with bus 111 for processing information. Processor 112 includes a processor core, but is not limited to a processor core, such as for example, ARM™, Pentium™, etc.

Processor 100 further comprises a random access memory (RAM), or other dynamic storage device 104 (referred to as main memory) coupled to bus 111 for storing information and instructions to be executed by processor 112. Main memory 104 also may be used for storing temporary variables or other intermediate information during execution of instructions by processor 112.

Processor 100 also comprises a read only memory (ROM) and/or other static storage device 106 coupled to bus 111 for storing static information and instructions for processor 112, and a non-transitory data storage device 107, such as a magnetic storage device or flash memory and its corresponding control circuits. Data storage device 107 is coupled to bus 111 for storing information and instructions.

Processor 100 may further be coupled to a display device 121 such a flat panel display, coupled to bus 111 for displaying information to a computer user. Voice recognition, optical sensor, motion sensor, microphone, keyboard, touch screen input, and pointing devices may be attached to bus 111 or a wireless network for communicating selections and command and data input to processor core 112.

Figure 1B:
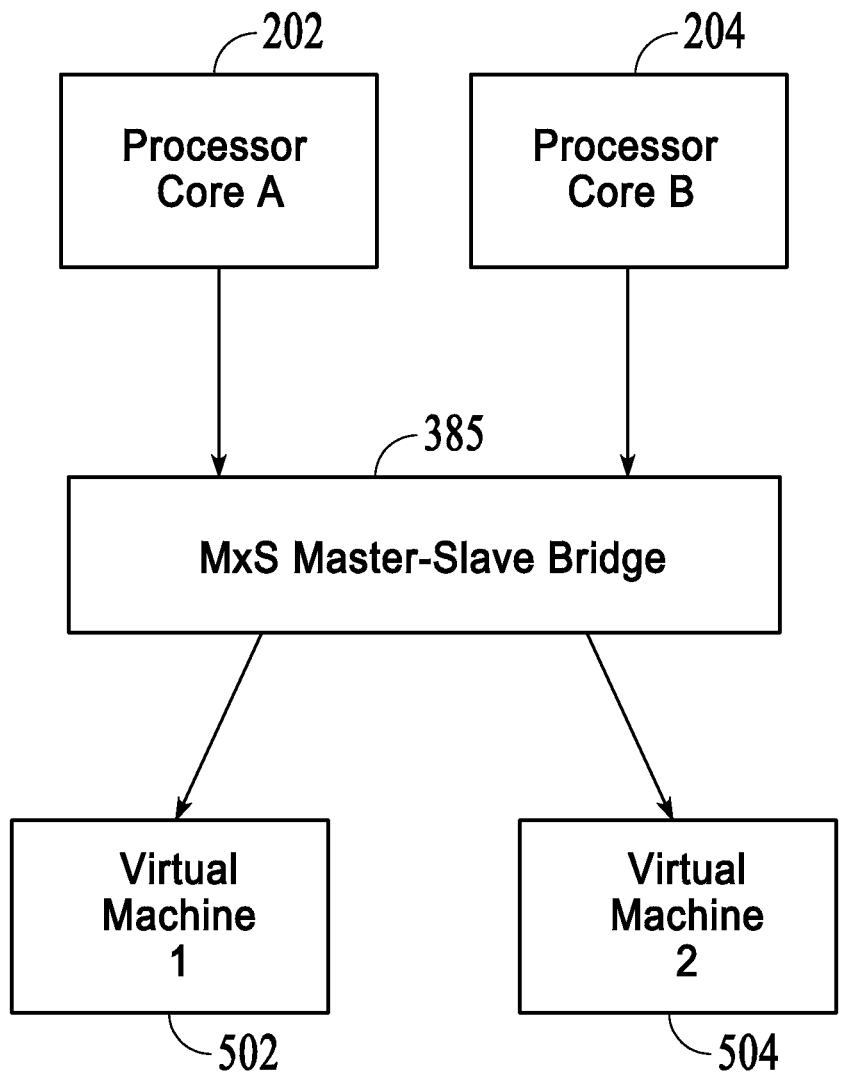

One aspect of the invention is system embodiment illustrated in FIG. 1B. M×S Master-Slave Bridge 385 communicatively couples at least one processor core 201 204 to at least one virtual machine 502 504. In an embodiment, the one or more virtual machines are hosted by a radio or baseband processor. In an embodiment, the one or more processor cores are provisioned by an application processor. In an embodiment the M×S Master-Slave Bridge is also provisioned by a process in the application processor. The Master-Slave Bridge isolates communication of metrics from a virtual machine to at most one processor core.

Note that any or all of the components of processor 100 and associated hardware may be used in the present invention. However, it can be appreciated that other configurations of the computer system may include some or all of the devices in one apparatus, a network, or a distributed cloud of processors.

A number of embodiments of the invention have been described. Nevertheless, it will be understood that various modifications may be made without departing from the spirit and scope of the invention. For example, other network topologies may be used. Accordingly, other embodiments are within the scope of the following claims.

The invention claimed is:

1. An apparatus comprising:
an electronic signal communication bus between an application processor and a baseband processor;
the baseband processor comprising at least one slave agent circuit;
the application processor comprising at least one master agent circuit;
wherein the at least one slave agent circuit is embedded during its manufacturing and test process, and wherein the at least one master agent is received and installed during a wireless connection to a network server after authentication and validation of a profile using a private key of the at least one slave agent circuit.

2. The apparatus of claim 1 wherein at least one slave agent circuit comprises:
an authentication circuit to validate a received profile and to authenticate each data connection to a master agent circuit;
a trigger circuit to determine when a condition within a received profile is fulfilled;
a transformation circuit to quantize, store and transfer a radio metric value from the baseband processor via an authenticated data connection to a master agent circuit.

3. The apparatus of claim 2 wherein the application processor comprises a received profile store containing a digital signature associated with the received profile and with a private key of a slave agent circuit.

4. An apparatus comprising:
an electronic signal communication bus between an application processor and a baseband processor;
the baseband processor comprising a plurality of slave agent circuits;
the application processor comprising at least one master agent circuit;
wherein at least one slave agent circuit is embedded during its manufacturing and test process, and wherein the at least one master agent is received and installed during a wireless connection to a network server after authentication and validation of a profile using a private key of the at least one slave agent circuit.

5. An apparatus comprising:
an electronic signal communication bus between an application processor and a baseband processor;
the baseband processor comprising at least one slave agent circuit;
the application processor comprising a plurality of master agent circuits;
wherein the at least one slave agent circuit is embedded during its manufacturing and test process, and wherein at least one master agent is received and installed during a wireless connection to a network server after authentication and validation of a profile using a private key of the at least one slave agent circuit.

6. A method for operation of a multiple profile defined wireless data collection apparatus by executable instructions stored in non-transitory media causing a processor to perform:

receiving and installing a validated master agent application;

recording metrics according to an authenticated collection profile;

transforming a radio metric to contain a destination connection identity;

opening a private data connection to a specific master agent identified in a collection profile; and upon verification of a private data connection, transferring the transformed radio metric to the specific master agent, whereby a slave agent circuit embedded during manufacturing, and test of a baseband processor validates a master agent installed by wireless transmission and accepts a data collection profile associated with the master agent.

7. The method of claim 6 wherein receiving and installing a validated master agent application comprises:

opening a secure communication channel to a wireless network server;

authenticating the server;

requesting by the application processor, a master agent installation file; and verifying the file against a private key and installing the master agent.

8. The method of claim 6 wherein recording metrics according to an authenticated collection profile comprises:

receiving a data collection profile associated with a certain master agent, validating the data collection profile with a private key, and upon determining a condition within the data collection profile is fulfilled, quantizing and storing a radio metric.

\* \* \* \* \*